US011982963B2

(12) United States Patent
Saeki

(10) Patent No.: US 11,982,963 B2
(45) Date of Patent: May 14, 2024

(54) IMAGE PROCESSING APPARATUS AND IMAGE PROCESSING METHOD

(71) Applicant: TOSHIBA TEC KABUSHIKI KAISHA, Tokyo (JP)

(72) Inventor: Ryota Saeki, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/986,096

(22) Filed: Nov. 14, 2022

(65) Prior Publication Data

US 2023/0072166 A1 Mar. 9, 2023

Related U.S. Application Data

(63) Continuation of application No. 17/313,786, filed on May 6, 2021, now Pat. No. 11,526,108.

(30) Foreign Application Priority Data

Aug. 6, 2020 (JP) ................................ 2020-133817

(51) Int. Cl.
*G03G 15/00* (2006.01)
*G03G 15/20* (2006.01)

(52) U.S. Cl.
CPC ......... *G03G 15/55* (2013.01); *G03G 15/2039* (2013.01)

(58) Field of Classification Search
CPC ........................... G03G 15/55; G03G 15/2039
See application file for complete search history.

(56) References Cited

U.S. PATENT DOCUMENTS

2015/0037052 A1* 2/2015 Muramatsu ........ G03G 15/2042 399/334
2017/0075267 A1 3/2017 Yoshimura
2020/0174407 A1 6/2020 Furuichi
2021/0080880 A1* 3/2021 Shinohara .......... G03G 15/5045

* cited by examiner

*Primary Examiner* — Stephanie E Bloss
*Assistant Examiner* — Michael A Harrison
(74) *Attorney, Agent, or Firm* — Kim & Stewart LLP

(57) ABSTRACT

An image processing apparatus includes an image forming unit configured to form an image on a sheet, a heating device including a belt that contacts the sheet and a plurality of heating elements for heating the belt, a pressure roller configured to press the sheet against the belt, a voltage detection circuit configured to measure a voltage applied to the heating elements, and a controller configured to determine whether at least one of the heating elements is abnormal according to a voltage drop value that is based on voltages measured by the voltage detection unit before and after the plurality of heating elements is energized.

20 Claims, 8 Drawing Sheets

IMAGE PROCESSING APPARATUS AND IMAGE PROCESSING METHOD

CROSS-REFERENCE TO RELATED APPLICATIONS

This application is a continuation of U.S. patent application Ser. No. 17/313,786, filed on May 6, 2021, which is based upon and claims the benefit of priority from Japanese Patent Application No. 2020-133817, filed on Aug. 6, 2020, the entire contents of each of which are incorporated herein by reference.

FIELD

Embodiments described herein relate generally to image processing apparatus and image processing method.

BACKGROUND

Conventionally, an image forming apparatus has been used to form an image on a sheet. The image forming apparatus includes a fixing device that fixes toner to a sheet by heating. The fixing device typically includes a heating element and a temperature sensor. The image forming apparatus can detect an abnormality in the heating element based on the temperature of the heating element measured by the temperature sensor. However, when there are a plurality of heating elements, a plurality of temperature sensors are correspondingly required to measure temperatures of the different heating elements, and thus the image forming apparatus configuration becomes more complicated.

DETAILED DESCRIPTION

In general, according to one embodiment, an image processing apparatus includes an image forming unit configured to form an image on a sheet, a heating device including a belt that contacts the sheet and a plurality of heating elements the for heating the belt to press the sheet against the belt, a voltage detection circuit configured to measure a voltage applied to the plurality of heating elements, and a controller configured to determine whether at least one of the heating elements is abnormal according to a voltage drop value that is based on voltages measured by the voltage detection unit before and after the plurality of heating elements is energized.

Hereinafter, an image processing apparatus according to one or more embodiments will be described with reference to the drawings.

Figure 1:
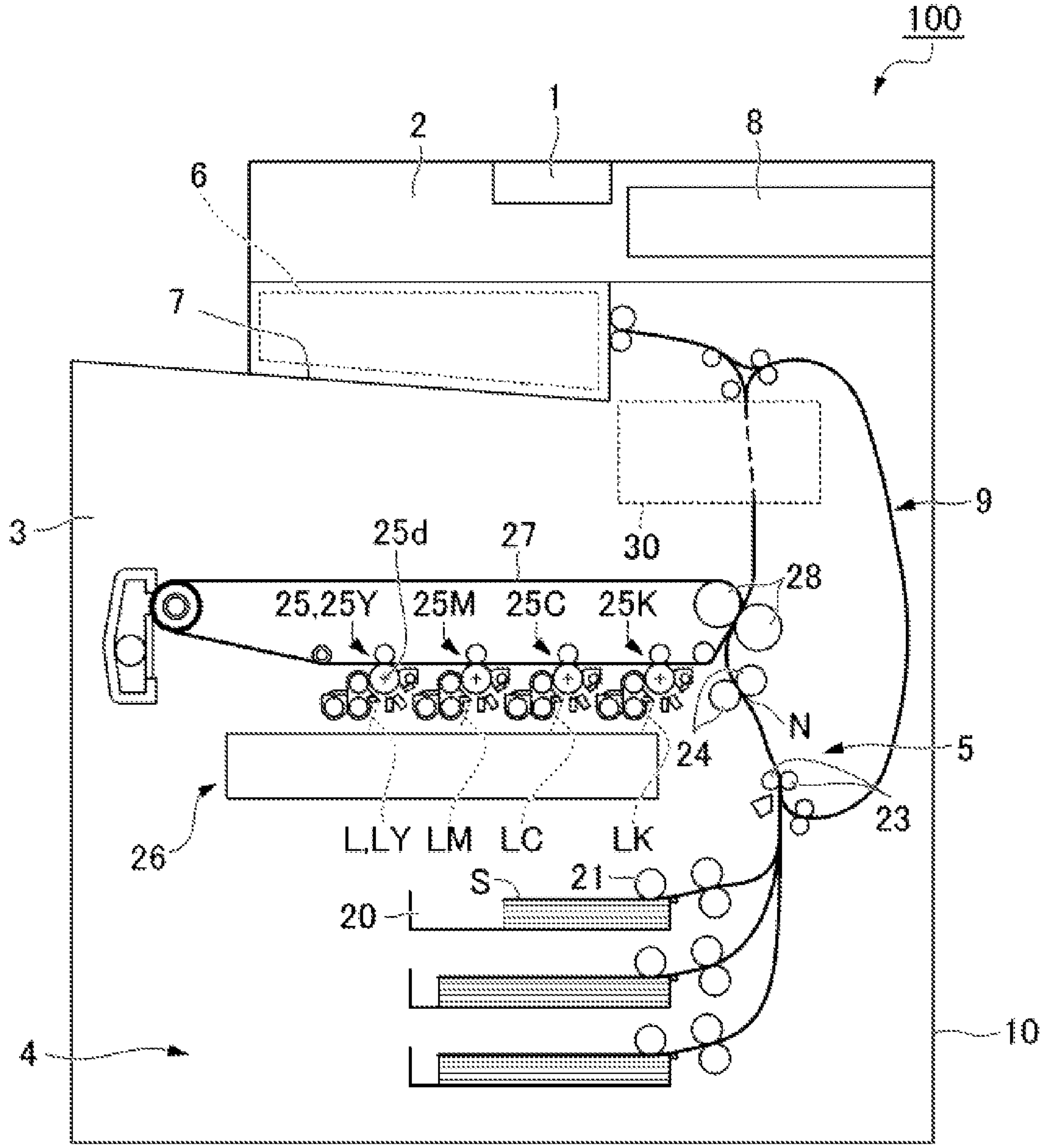
FIG. 1 is a schematic diagram of an image processing apparatus according to an embodiment.

FIG. 1 is a schematic diagram of an image processing apparatus 100 according to an embodiment. For example, the image processing apparatus 100 is an image forming apparatus configured to form an image on a sheet S.

The image processing apparatus 100 is, for example, a multifunction peripheral (MFP). The image processing apparatus 100 includes a housing 10, a display 1, a scanner unit 2, an image forming unit 3, a sheet supply unit 4, a conveyance unit 5, a discharge tray 7, a reversing unit 9, a control panel 8, and a controller 6. The image forming unit 3 may be a device for fixing a toner image or an ink jet type device.

The image processing apparatus 100 forms an image on a sheet S using a developer such as toner. The sheet S is a printing medium such as paper, label paper, or a resin sheet.

The housing 10 houses various components of the image processing apparatus 100. The display 1 is an image display device such as a liquid crystal display (LCD) or an organic EL (Electro Luminescence) display. The display 1 displays various types of information related to the statuses and operations of the image processing apparatus 100.

The scanner unit 2 reads image information to be read as brightness and darkness of light. The scanner unit 2 records the read image information. The scanner unit 2 outputs the generated image information to the image forming unit 3. The recorded image information may be transmitted to another information processing apparatus via a network.

The image forming unit 3 forms an output image (hereinafter referred to as a toner image) with a printing material such as toner based on the image information received from the scanner unit 2 or image information received from an external device via a network. The image forming unit 3 transfers the toner image onto the surface of the sheet S. The image forming unit 3 heats and presses the toner image on the surface of the sheet S to fix the toner image on the sheet S. Details of the image forming unit 3 will be described later. The sheet S may be a sheet supplied by the sheet supply unit 4 or may be a sheet that is manually fed.

The sheet supply unit 4 supplies sheets S one by one to the conveyance unit 5 in accordance with the timing at which the image forming unit 3 forms the toner image. The sheet supply unit 4 includes a sheet storage unit 20 and a pickup roller 21.

The sheet storage unit 20 stores the sheets S of a predetermined size and type. The pickup roller 21 takes out the sheets S one by one from the sheet storage unit 20. The pickup roller 21 supplies the taken-out sheet S to the conveyance unit 5.

The conveyance unit 5 conveys the sheet S supplied from the sheet supply unit 4 to the image forming unit 3. The conveyance unit 5 includes conveyance rollers 23 and registration rollers 24. The conveyance rollers 23 convey the sheet S supplied from the pickup roller 21 to the registration rollers 24. The conveyance rollers 23 cause the front end of the sheet S in the conveyance direction to butt against a nip N of the registration rollers 24.

The registration rollers 24 adjust the front end of the sheet S in the conveyance direction by bending the sheet S in the nip N. The registration rollers 24 convey the sheet S in accordance with the timing at which the image forming unit 3 transfers the toner image onto the sheet S.

The image forming unit 3 will be described. The image forming unit 3 includes a plurality of image forming units 25, a laser scanning unit 26, an intermediate transfer belt 27, a transfer unit 28, and a heating device 30. Each image forming unit 25 includes a photoreceptor drum 25*d*. Each image forming unit 25 forms a toner image on the corresponding photosensitive drum 25*d* according to the image information received from the scanner unit 2 or an external device. The plurality of image forming units 25Y, 25M, 25C, 25K form toner images with yellow, magenta, cyan, and black toners, respectively.

A charger, a developing device, and the like are disposed around each photosensitive drum 25*d*. The charger charges the corresponding photosensitive drum 25*d*. Each developing device contains a developer containing one of yellow, magenta, cyan, and black toners. Each developing device develops the electrostatic latent images on the corresponding photosensitive drum 25*d*. As a result, a toner image of each of the colors is formed on the corresponding photosensitive drum 25*d*.

The laser scanning unit 26 scans each photosensitive drum 25*d* with laser light L to expose the photosensitive drum 25*d*. The laser scanning unit 26 exposes the photosensitive drums 25*d* of the image forming units 25Y, 25M, 25C, and 25K of the respective colors with the laser beams LY, LM, LC, LK. Thus, the laser scanning unit 26 forms electrostatic latent images on the photosensitive drum 25*d*.

The toner image on each photosensitive drum 25*d* is primarily transferred onto the intermediate transfer belt 27. The transfer unit 28 transfers each toner image primarily transferred onto the intermediate transfer belt 27 onto the surface of the sheet S at the secondary transfer position. The heating device 30 heats and presses the toner image transferred onto the sheet S to fix the toner image onto the sheet S. Details of the heating device 30 will be described later.

The reversing unit 9 reverses the sheet S in order to form an image on the back surface of the sheet S. The reversing unit 9 reverses the sheet S discharged from the heating device 30 by switchback. The reversing unit 9 conveys the reversed sheet S toward the registration rollers 24.

The sheet S on which an image has been formed and which has been discharged is placed on the sheet discharge tray 7. The control panel 8 includes a plurality of buttons. The control panel 8 accept an input of a user operation. The control panel 8 outputs a signal corresponding to the user operation input by the user to the controller 6 of the image processing apparatus 100. The display 1 and the control panel 8 may be integrated into a touch display. The controller 6 is a control circuit configured to control each unit of the image processing apparatus 100.

Figure 2:
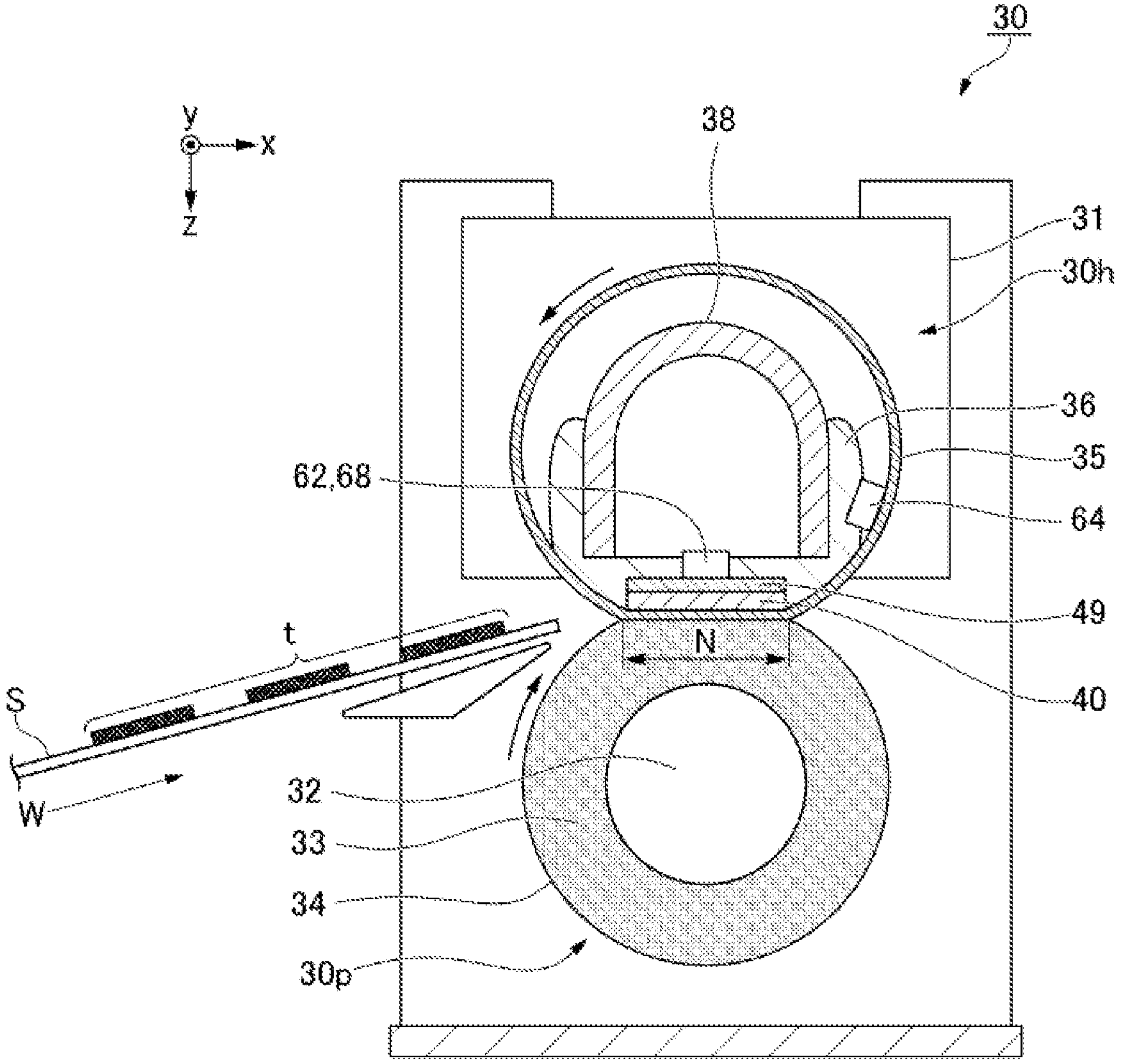
FIG. 2 is a cross-sectional view of a fixing device according to an embodiment.

The heating device 30 will be described in detail. FIG. 2 is a sectional view of the heating device 30. In one embodiment, the heating device 30 is a fixing device configured to fix a toner image onto the sheet S. As shown in FIG. 2, the heating device 30 includes a pressure roller 30*p* and a belt unit 30*h*.

The pressure roller 30*p* forms a nip N with the belt unit 30*h*. The pressure roller 30*p* presses a toner image t formed on the sheet S entering the nip N. The pressure roller 30*p* rotates and conveys the sheet S. The pressure roller 30*p* includes a core metal 32, an elastic layer 33, and a release layer 34. The pressure roller 30*p* can be pressed against the fixing belt 35 and rotated by a motor (not shown).

The core metal 32 is formed in a cylindrical shape from a metal material such as stainless steel. Both end portions of the core metal 32 in the axial direction are rotatably supported. The core metal 32 is rotationally driven by the motor (not shown). The core metal 32 contacts a cam member (not shown). The cam member rotates to move the core metal 32 toward and away from the belt unit 30*h*.

The elastic layer 33 is formed of an elastic material such as silicone rubber. The elastic layer 33 is formed on the outer peripheral surface of the core surface of the core metal 32. The release layer 34 is formed of a resin material such as PFA (tetrafluoroethylene-per fluoroalkyl vinyl ether copolymer). The release layer 34 is formed on the outer peripheral surface of the elastic layer 33. The hardness of the outer peripheral surface of the pressure roller 30*p* is preferably 40° to 70° under a load of 9.8N measured by an ASKER-C hardness meter. Thus, the area of the nip N and the durability of the pressure roller 30*p* are ensured.

The pressure roller 30*p* can approach and separate from the belt unit 30*h* by rotation of the cam member. When the pressure roller 30*p* is brought close to the belt unit 30*h* and pressed by a pressure spring, the nip N is formed. On the other hand, when the sheet S is jammed in the heating device 30, the sheet S can be removed by separating the pressure roller 30*p* from the belt unit 30*h*. Further, in a state where the rotation of the fixing belt 35 is stopped such as during sleep, the pressure roller 30*p* is separated from the belt unit 30*h*, thereby preventing the fixing belt 35 from being plastically deformed.

As described above, the pressure roller 30*p* is rotationally driven by a motor. When the pressure roller 30*p* rotates in a state where the nip N is formed, the fixing belt 35 in the belt unit 30*h* is driven to rotate. The pressure roller 30*p* transports the sheet S in the transport direction W by rotating in a state in which the sheet S is disposed in the nip N.

The belt unit 30*h* heats the toner image t formed on the sheet S that has entered the nip N. The belt unit 30*h* includes a fixing belt 35, a heater unit 40, a heat conduction member 49, a support member 36, a stay 38, a heater thermometer 62, a thermostat 68, and a belt thermometer (s) 64. The heater unit 40 is also referred to as a "heat generator".

The fixing belt 35 is formed in a cylindrical shape. The fixing belt 35 includes a base layer, an elastic layer, and a release layer in this order from the inner circumferential side. The base layer is formed in a cylindrical shape. The elastic layer is laminated on the outer peripheral surface of the base layer. The elastic layer is formed of an elastic material such as rubber. The release layer is laminated on the outer peripheral surface of the elastic layer. The release layer is formed of a material such as PFA resin. The fixing belt 35 fixes the toner image t to the sheet S.

Figure 3:
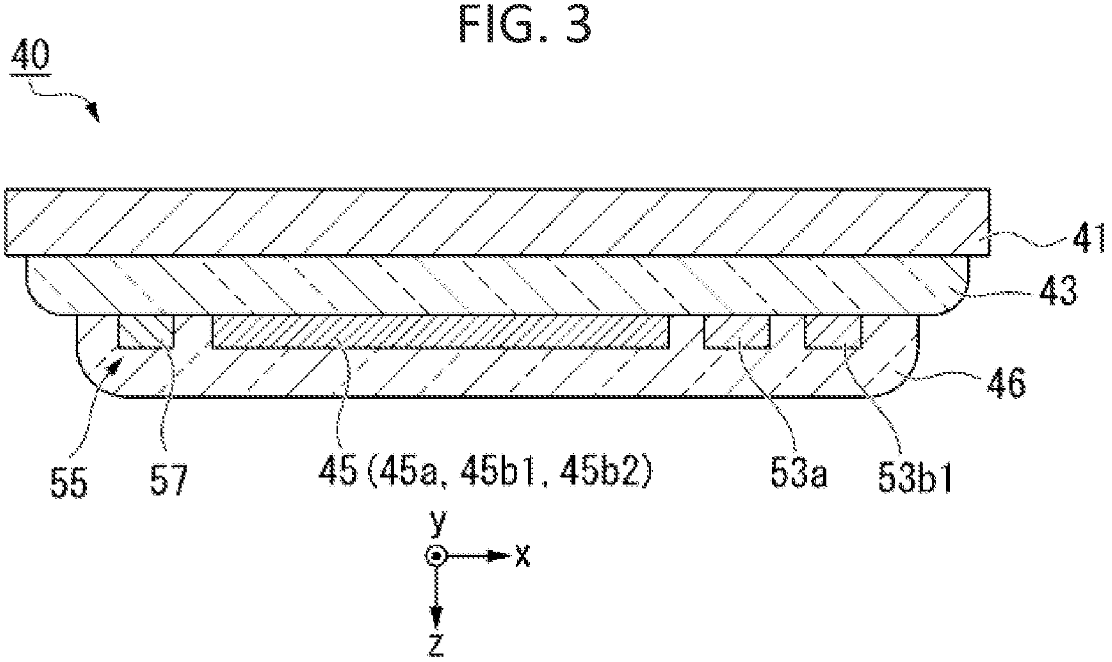
FIG. 3 is a cross-sectional view of a heater unit.
Figure 4:
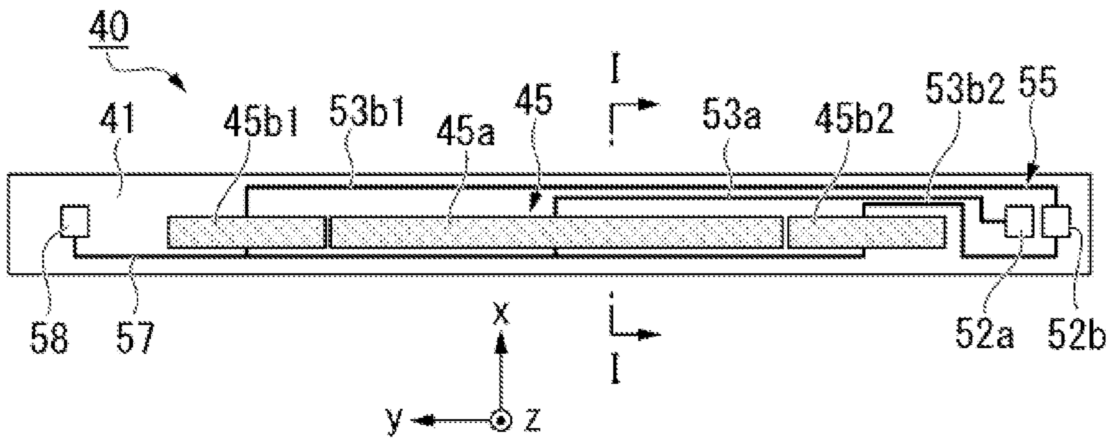
FIG. 4 is a bottom view of a heater unit.

FIG. 3 is a sectional view of the heater unit 40 taken along line I-I of FIG. 4. FIG. 4 is a bottom view of the heater unit 40 viewed from the +z direction. As shown in FIG. 3, the heater unit 40 includes a substrate 41, a heating element group 45, and a wiring group 55.

The substrate 41 is formed of a metal material such as stainless steel, a ceramic material such as aluminum nitride, or the like. The substrate 41 is formed in an elongated rectangular plate shape. The substrate 41 is disposed radially inward of the fixing belt 35. The longitudinal direction of the substrate 41 is the axial direction of the fixing belt 35.

The x, y and z directions are defined as follows. The y direction is the longitudinal direction of the substrate 41. The y direction is parallel to the width direction of the fixing belt 35. As described later, the +y direction is a direction from a central heating element unit 45*a* toward a first end heating element 45*b*1. The x direction is the short direction of the substrate 41, and the +x direction is the conveyance direction or downstream direction of the sheet S. The x direction is orthogonal to the y direction. The z direction is a normal direction of the substrate 41, and the +z direction is a direction in which the heating element group 45 is disposed with respect to the substrate 41. An insulating layer 43 made of a glass material or the like is formed on the surface of the substrate 41 in the +z direction.

The heating element group 45 is disposed on the substrate 41. The heating element group 45 is formed on the surface of the insulating layer 43 on the +z direction side. The heating element group 45 is formed of a TCR (Temperature Coefficient of Resistance) material. For example, the heating element group 45 is formed by screen printing or the like using a silver-palladium alloy or the like.

The heating element group 45 and the wiring group 55 are formed on the surface of the insulating layer 43 in the +z direction. A protective layer 46 is formed of a glass material or the like so as to cover the heating element group 45 and the wiring group 55. The protective layer 46 improves slidability (reduces friction) between the heater unit 40 and the fixing belt 35.

As shown in FIG. 4, the heating element group 45 includes the first end heating element **45*b*1, the central heating element unit 45*a*, and a second end heating element 45*b*2**, which are arranged side by side along the y direction.

The central heating element unit **45*a* is disposed at the center of the heating element group 45 in the y direction. The first end heating element 45*b*1 is disposed on the +y direction side of the central heating element unit 45*a* and at the end of the heating element group 45 in the +y direction. The second end heating element 45*b*2 is disposed on the −y direction side of the central heating element unit 45*a* and at the end of the heating element group 45 in the −y direction. A boundary line between the central heating element unit 45*a* and the first end heating element 45*b*1 may be disposed parallel to the x direction or may be disposed to intersect the x direction. The same applies to the boundary line between the central heating element unit 45*a* and the second end heating element 45*b*2**.

The heating element group 45 generates heat by energization. The electric resistance value of the central heating element unit **45*a* is smaller than the electric resistance values of the first end heating element 45*b*1 and the second end heating element 45*b*2. The electric resistance values of the first end heating element 45*b*1 and the second end heating element 45*b*2 are substantially the same. The ratio of the electric resistance value of the central heating element unit 45*a* to the electric resistance value of the first end heating element 45*b*1 and the second end heating element 45*b*2** is preferably set in the range of 1:3 to 1:7, and more preferably set in the range of 1:4 to 1:6.

Heat generation of the central heating element unit **45*a* and the first and second end heating elements 45*b*1 and 45*b*2 is controlled independently of each other. On the other hand, the heat generation of the first end heating element 45*b*1 and the second end heating element 45*b*2 is similarly controlled. For example, one of the first end heating element 45*b*1 and the second end heating element 45*b*2 generates heat when the other generates heat. The sheet Shaving a small width in the y direction passes through a central portion of the heating device 30 in the y direction. In such a case, the controller 6 can cause only the central heating element unit 45*a* to generate heat. When the sheet S has a large width in the y direction, the controller 6 can cause the entire heating element group 45 to generate heat. The heat generation of the first end heating element 45*b*1 and the second end heating element 45*b*2** may be controlled independently of each other.

The wiring group 55 is formed of a material comprising a metal such as silver. The wiring group 55 includes a central contact **52*a*, a central wiring 53*a*, an end contact 52*b*, a first end wiring 53*b*1, a second end wiring 53*b*2, a common contact 58, and a common wiring 57**.

The central contact **52*a* is disposed on the −y direction side of the heating element group 45. The central wiring 53*a* is arranged on the +x direction side of the heating element group 45. The center wiring 53*a* connects the end side of the central heating element unit 45*a* in the +x direction and the central contact 52*a***.

The end contact **52*b* is disposed on the −y direction side of the central contact 52*a*. The first end wiring 53*b*1 connects the end side of the first end heating element 45*b*1 in the +x direction and an end portion of the end contact 52*b* in the +x direction. The second end wiring 53*b*2 connects the end side of the second end heating element 45*b*2 in the +x direction and the end portion of the end contact 52*b*** in the −x direction.

The common contact 58 is disposed on the +y direction side of the heating element group 45. The common wiring 57 connects the end sides in the −x direction of the central heating element unit **45*a*, the first end heating element 45*b*1, and the second end heating element 45*b*2, to the common contact 58**.

In FIG. 2, the heater unit 40 is disposed inside the fixing belt 35. A lubricant (not shown) is applied to the inner circumferential surface of the fixing belt 35. The heater unit 40 is in contact with the inner circumferential surface of the fixing belt 35 via the lubricant. When the heater unit 40 generates heat, the viscosity of the lubricant decreases. This ensures the slidability between the heater unit 40 and the fixing belt 35. As described above, the fixing belt 35 is a belt-shaped thin film that slides on the surface of the heater unit 40 while one surface of the fixing belt 35 is in contact with the heater unit 40.

The heat conduction member 49 is formed of a metal material having high heat conductivity such as copper. The outer shape of the heat conduction member 49 is the same as the outer shape of the substrate 41 of the heater unit 40. The heat conduction member 49 contacts the surface of the heater unit 40 in the −z direction. By forming a metal layer containing nickel on the surface of the heat conduction member 49, deterioration of the contact surface with the heater unit 40 can be suppressed. The metal layer can be formed by plating.

The support member 36 is formed of a resin material such as a liquid crystal polymer. The support member 36 covers the side in −z direction of the heater unit 40 and both sides in the x direction of the heater unit 40. The support member 36 supports the heater unit 40 via the heat conduction member 49. Both ends of the support member 36 in the x direction are rounded. The support member 36 supports the inner circumferential surface of the fixing belt 35 at both ends of the heater unit 40 in the x direction.

The stay 38 is formed of a steel plate material or the like. The cross section of the stay 38 perpendicular to the y direction is formed in a U shape. The stay 38 is attached to the support member 36 from the −z direction so that the opening of the U shape is closed by the support member 36. The stay 38 extends along the y direction. Both end portions of the stay 38 in the y direction are fixed to the housing 10 of the image processing apparatus 100. Thus, the belt unit **30*h* is supported by the image processing apparatus 100. The stay 38 improves the bending rigidity of the belt unit 30*h***.

Flanges 31 for restricting the movement of the fixing belt 35 in the y direction are mounted near both ends of the stay 38 in the y direction.

Figure 5:
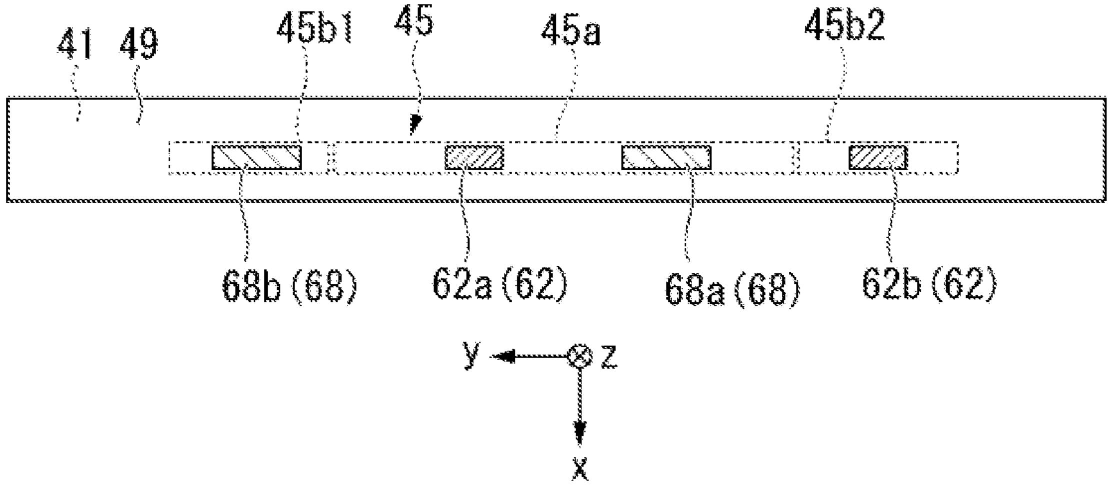
FIG. 5 is a plan view of a heater thermometer and a thermostat.

FIG. 5 is a plan view of the heater thermometer 62 and the thermostat 68 viewed from the −x direction. As shown in FIG. 5, the plurality of heater thermometers 62 include a central heater thermometer 62*a* and an end heater thermometer 62*b*. The central heater thermometer 62*a* measures the temperature of the central heating element unit 45*a*. The central heater thermometer 62*a* is arranged within the range of the central heating element unit 45*a* in the x and y directions. That is, when viewed from the z direction, the central heater thermometer 62*a* and the central heating element unit 45*a* overlap each other.

The end heater thermometer 62*b* measures the temperature of the second end heating element 45*b*2. The end heater thermometer 62*b* is disposed within the second end heating element 45*b*2 in the x and y directions. That is, when viewed from the z direction, the end heater thermometer 62*b* and the second end heating element 45*b*2 overlap each other. Since the first end heating element 45*b*1 and the second end heating element 45*b*2 are similarly controlled to generate heat, the temperature of the first end heating element 45*b*1 and the temperature of the second end heating element 45*b*2 are equal to each other.

The plurality of thermostats 68 include a central thermostat 68*a* and an end thermostat 68*b*. When the temperature of the central heating element unit 45*a* exceeds a predetermined temperature, the central thermostat 68*a* cuts off the energization to the heating element group 45. The central thermostat 68*a* is arranged within the range of the central heating element unit 45*a* in the x and y directions. That is, when viewed from the z direction, the central thermostat 68*a* and the central heating element unit 45*a* overlap each other.

The end thermostat 68*b* interrupts energization to the heating element group 45 when the temperature of the first end heating element 45*b*1 exceeds a predetermined temperature. The end thermostat 68*b* is disposed within the first end heating element 45*b*1 in the x and y directions. That is, when viewed from the z direction, the end thermostat 68*b* and the first end heating element 45*b*1 overlap each other.

The central heater thermometer 62*a* and the central thermostat 68*a* are arranged within the range of the central heating element unit 45*a* so that the temperature of the central heating element unit 45*a* is measured. When the temperature of the central heating element unit 45*a* exceeds a predetermined temperature, energization to the heating element group 45 is interrupted. On the other hand, the end heater thermometer 62*b* and the end thermostat 68*b* are disposed within the range of the second end heating element 45*b*2 and the first end heating element 45*b*1, respectively so that the temperatures of the first end heating element 45*b*1 and the second end heating element 45*b*2 are measured. When the temperature of the first end heating element 45*b*1 and the second end heating element 45*b*2 exceeds the predetermined temperature, the energization to the heating element group 45 is interrupted.

Figure 6:
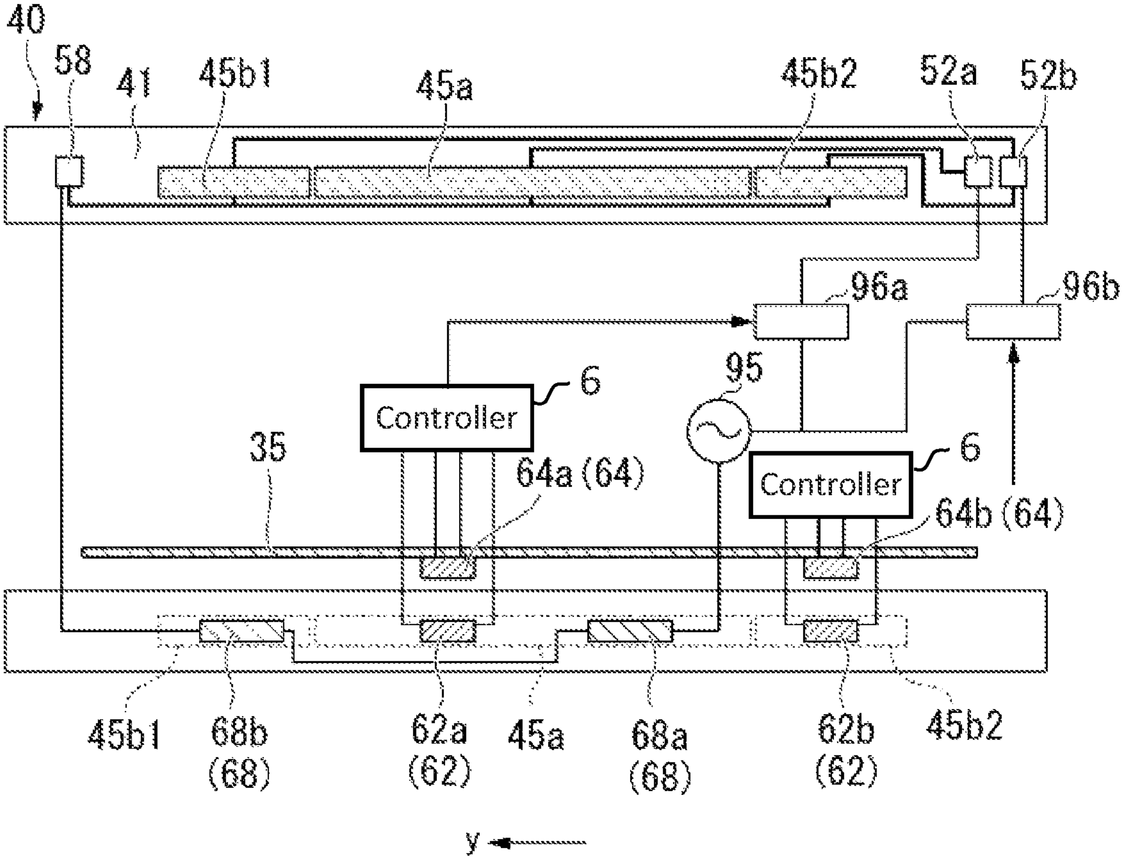
FIG. 6 is a circuit diagram of a fixing device.

FIG. 6 is a circuit diagram of the heating device 30. FIG. 6 also shows a bottom view of the heater unit 40 (see FIG. 4) and a plan view of the heater thermometer 62 and the thermostat 68 (see FIG. 5). FIG. 6 further shows a cross section of the fixing belt 35 and a plurality of belt thermometers 64. FIG. 6 depicts the controller 6 in two separate portions, but this is for convenience of illustration of different connections and the like in the depicted example.

As shown in FIG. 6, the plurality of belt thermometers 64 include a central belt thermometer 64*a* and an end belt thermometer 64*b*. The central belt thermometer 64*a* is in contact with a central portion of the fixing belt 35 in the y direction (e.g., the left-right page direction in FIG. 6). The central belt thermometer 64*a* is in contact with the fixing belt 35 within the range of the central heating element unit 45*a* along the y direction. The central belt thermometer 64*a* measures the temperature of the central portion of the fixing belt 35 in the y direction.

The end belt thermometer 64*b* is in contact with the fixing belt 35 at a position close to the end of thereof in the −y direction. The end belt thermometer 64*b* contacts the fixing belt 35 within the range of the second end heating element 45*b*2 in the y direction. The end belt thermometer 64*b* can measure the temperature of the end portion of the fixing belt 35 in the −y direction. As described above, the first end heating element 45*b*1 and the second end heating element 45*b*2 are similarly controlled to generate heat. Therefore, the temperature of the end portion of the fixing belt 35 in the −y direction is equal to the temperature of the end portion of the fixing belt 35 in the +y direction.

A power supply 95 is connected to the central contact 52*a* via a center triac 96*a*. The power supply 95 is connected to the end contact 52*b* via an end triac 96*b*. The controller 6 controls ON/OFF of the center triac 96*a* and the end triac 96*b* independently of each other.

When the controller 6 turns on the central triac 96*a*, the central heating unit 45*a* is energized from the power supply 95. As a result, the central heating unit 45*a* generates heat. When the controller 6 turns on the end triac 96*b*, the first end heating element 45*b*1 and the second end heating element 45*b*2 are energized from the power supply 95. As a result, the first end heating element 45*b*1 and the second end heating element 45*b*2 generate heat. As described above, the heat generation of the central heating element unit 45*a* and that of the first end heating element 45*b*1 and the second end heating element 45*b*2 are controlled independently of each other. The central heating element unit 45*a*, the first end heating element 45*b*1, and the second end heating element 45*b*2 are connected in parallel to the power supply 95.

The power supply 95 is further connected to the common contact 58 via the central thermostat 68*a* and the end thermostat 68*b*. The central thermostat 68*a* and the end thermostat 68*b* are connected in series. When the temperature of the central heating element unit 45*a* rises abnormally, the detected temperature of the central thermostat 68*a* exceeds a predetermined temperature. At this time, the central thermostat 68*a* cuts off the energization from the power supply 95 to the entire heating element group 45.

When the temperature of the first end heating element 45*b*1 rises abnormally, the detected temperature of the end thermostat 68*b* exceeds a predetermined temperature. At this time, the end thermostat 68*b* cuts off the energization from the power supply 95 to the entire heating element group 45. As described above, the first end heating element 45*b*1 and the second end heating element 45*b*2 are similarly controlled to generate heat. Therefore, when the temperature of the second end heating element 45*b*2 increases abnormally, the temperature of the first end heating element 45*b*1 also increases. Accordingly, also in the case where the temperature of the second end heating element 45*b*2 abnormally rises, the end thermostat 68*b* interrupts the energization from the power supply 95 to the entire heating element group 45.

The controller 6 acquires the temperature of the central heating element unit 45*a* from the central heater thermometer 62*a*. The controller 6 acquires the temperature of the second end heating element 45*b*2 from the end heater thermometer 62*b*. The temperature of the second end heating element **45*b*2 is equal to the temperature of the first end heating element 45*b*1. The controller 6 acquires the temperature of the heating element group 45 from the heater thermometer 62 at the time of starting (e.g., a warming up period or a startup time) the heating device 30** and at the time of returning from the temporary resting state (e.g., a sleep state).

When the temperature of at least one of the central heating element unit **45*a* and the second end heating element 45*b*2 is lower than a predetermined temperature at the time of starting the heating device 30 and at the time of returning from the temporary resting state, the controller 6 causes the heating element group 45 to generate heat for a short time. Thereafter, the controller 6 starts rotation of the pressure roller 30*p*. The viscosity of the lubricant applied to the inner circumferential surface of the fixing belt 35 decreases due to the heat generated by the heating element group 45. This ensures the slidability between the heater unit 40 and the fixing belt 35 at the start of rotation of the pressure roller 30*p***.

The controller 6 acquires the temperature of the center portion of the fixing belt 35 in the y direction from the central belt thermometer **64*a*. The controller 6 acquires the temperature of the end portion of the fixing belt 35 in the −y direction from the end belt thermometer 64*b*. The temperature of the end portion of the fixing belt 35 in the −y direction is substantially equal to the temperature of the end portion of the fixing belt 35 in the +y direction. During operation of the heating device 30, the controller 6 acquires the temperatures of the central portion and the end portions of the fixing belt 35** in the y direction.

The controller 6 controls the phase or the wave number of the power supplied to the heating element group 45 by the central triac **96*a* and the end triac 96*b*. The controller 6 controls energization to the central heating element unit 45*a* based on the temperature measurement result of the center portion of the fixing belt 35 in the y direction. The controller 6 controls energization to the first end heating element 45*b*1 and the second end heating element 45*b*2 based on the temperature measurement result of the end portion of the fixing belt 35** in the y direction.

Figure 7:
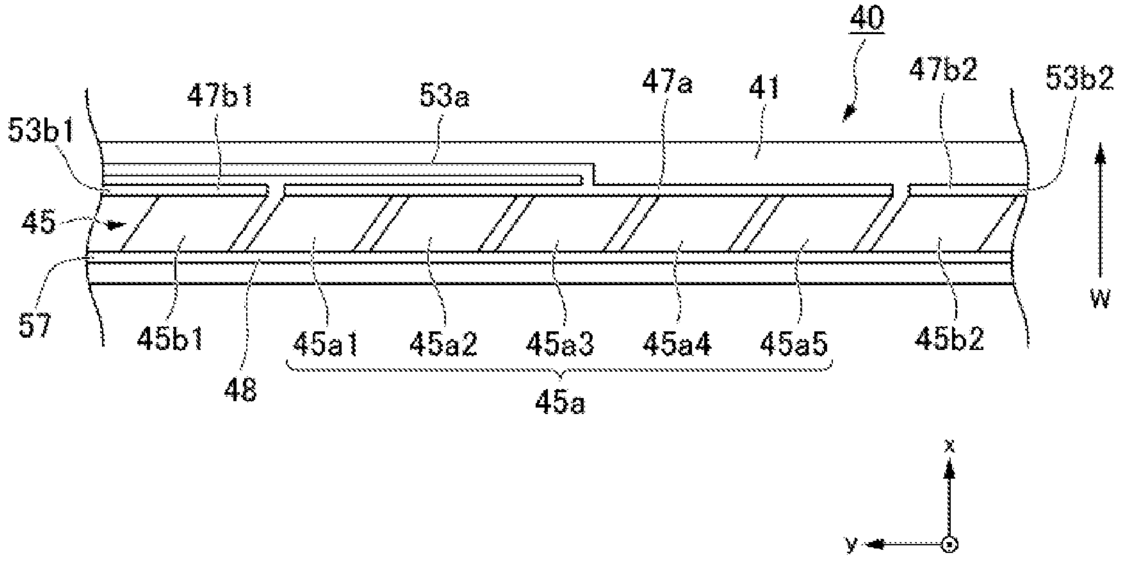
FIG. 7 is a schematic diagram of a heater unit.

FIG. 7 is a schematic diagram of the heater unit 40. As shown in FIG. 7, the central heating element unit **45*a* includes a plurality of central heating elements 45*a*1 to 45*a*5 arranged along the y direction. The central heating element unit 45*a* of this example includes five central heating elements 45*a*1 to 45*a*5** arranged along the y direction.

The heating element group 45 includes seven heating elements arranged along the y direction, that is, the first end heating element **45*b*1, the five central heating elements 45*a*1 to 45*a*5, and the second end heating element 45*b*2. The heating elements 45*b*1, 45*a*1 to 45*a*5, and 45*b*2** are arranged at intervals in the y direction.

The outer shape of each of the heating elements **45*b*1, 45*a*1 to 45*a*5, and 45*b*2 is, for example, a parallelogram. The entire region of the heating elements 45*b*1, 45*a*1 to 45*a*5, and 45*b*2 may be formed of a conductive layer. Alternatively, the heating elements 45*b*1, 45*a*1 to 45*a*5, and 45*b*2** may be formed of a wiring layer in a zigzag shape.

A common central individual electrode **47*a* is provided on the end sides of the central heating elements 45*a*1 to 45*a*5 in the +x direction. The central wiring 53*a* (see also FIG. 4) is connected to the central individual electrode 47*a*. A first end individual electrode 47*b*1 is connected to the end of the first end heating element 45*b*1 in the +x direction. The first end wiring 53*b*1 (see also FIG. 4) is connected to the first end individual electrode 47*b*1**.

A second end individual electrode **47*b*2 is provided on the end side of the second end heating element 45*b*2 in the +x direction. The second end wiring 53*b*2 (see also FIG. 4) is connected to the second end individual electrode 47*b*2**.

A common electrode 48 is provided on the end sides in the −x direction of the central heating elements **45*a*1 to 45*a*5, the first end heating element 45*b*1, and the second end heating element 45*b*2. The common wiring 57 (see also FIG. 4) is connected to the common electrode 48**.

Figure 8:
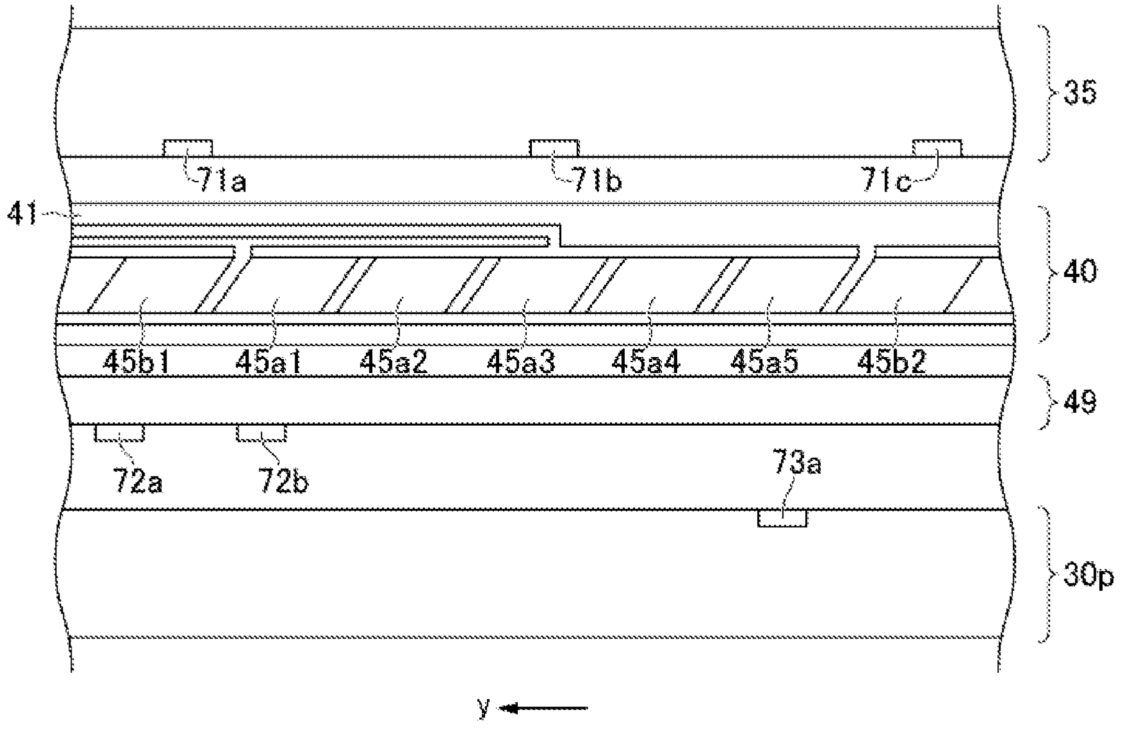
FIG. 8 is a schematic diagram of a fixing device.

FIG. 8 is a schematic diagram of the heating device 30. FIG. 8 shows the heater unit 40, the fixing belt 35, the heat conduction member 49, and the pressure roller **30*p*. In the fixing belt 35, a belt thermometer 71*a* is provided in a range of the first end heating element 45*b*1 in the y direction. In the fixing belt 35, a belt thermometer 71*b* is provided in a range of the central heating element 45*a*3 in the y direction. In the fixing belt 35, a belt thermometer 71*c* is provided in a range of the second end heating element 45*b*2 in the y direction. In a thermally conductive member 49, a thermally conductive member thermometer 72*a* is provided in a range of the first end heating element 45*b*1 in the y direction. In the thermally conductive member 49, a thermally conductive member thermometer 72*b* is provided in a range of the central heating element 45*a*1 in the y direction. In the pressure roller 30*p*, a roller thermometer 73*a* is provided in a range of the central heating element 45*a*5 in the y direction. The belt thermometers 71*a* to 71*c*, the thermally conductive member thermometers 72*a* and 72*b*, and the roller thermometer 73*a* are temperature sensors such as thermistors, thermocouples, and thermopiles, for example. Thermometers are not provided in ranges of the central heating element 45*a*2 and the central heating element 45*a*4** in the y direction.

The controller 6 (see FIG. 6) is configured to acquire the temperature of each heating element from the thermometers **71*a* to 71*c*, 72*a*, 72*b*, and 73*a***.

Figure 9:
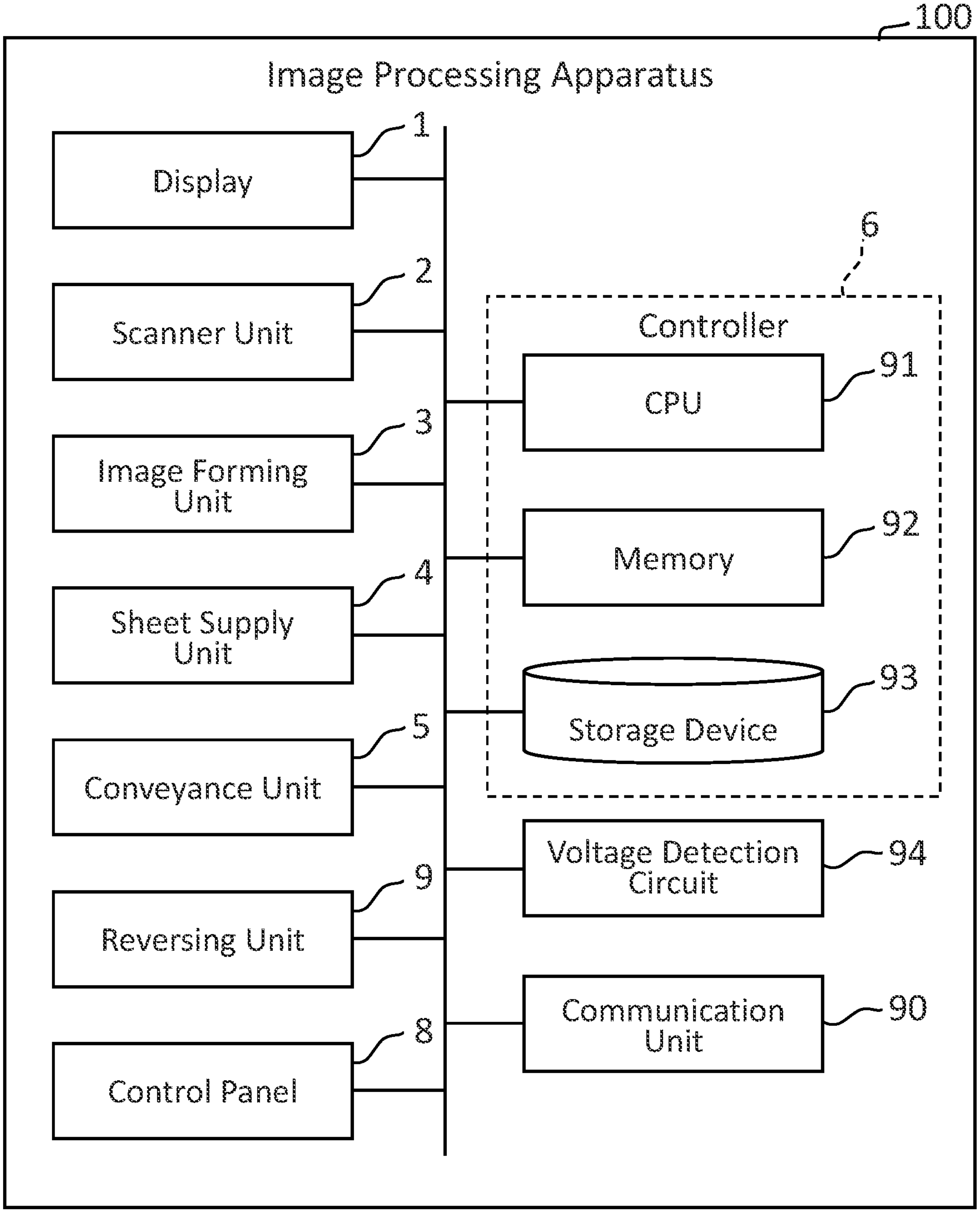
FIG. 9 is a hardware diagram illustrating an image forming apparatus.

FIG. 9 is a hardware diagram illustrating the image processing apparatus 100.

The image processing apparatus 100 includes the controller 6 including a CPU (Central Processing Unit) 91, a memory 92, and a storage device 93 and configured to execute one or more programs. The image processing apparatus 100 further includes a voltage detection circuit 94. As described above, the image processing apparatus 100 includes the scanner unit 2, the image forming unit 3, the sheet supply unit 4, the conveyance unit 5, the reversing unit 9, the control panel 8, and the communication unit 90, and control those components by executing the programs.

All or some of the functions of the image processing apparatus 100 may be implemented using hardware such as ASIC (Application Specific Integrated Circuit), PLD (Programmable Logic Device), or FPGA (Field Programmable Gate Array). The programs may be recorded in a computer-readable recording medium. The computer-readable recording medium is, for example, a portable medium such as a flexible disk, a magneto-optical disk, or a ROM, CD-ROM, or a storage device such as a hard disk incorporated in the computer system. The programs may be downloaded via a telecommunication line.

The CPU 91 of the controller 6 executes the programs stored in the memory 92 and/or the auxiliary storage device 93. The controller 6 controls the operation of each unit of the image processing apparatus 100. For example, the storage device 93 is a magnetic hard disk device (HDD) or a semiconductor storage device (SSD). The auxiliary storage device 93 stores various types of information related to the operations of the image processing apparatus 100. The communication unit 90 is a network interface circuit configured to communicate with an external apparatus via a network such as the Internet.

The voltage detection circuit 94 is configured to detect a voltage applied to the heating element group 45 by the power supply 95 (see FIG. 6) when the heating element group 45 (see FIG. 4) is energized.

The controller 6 determines whether there is an abnormality in the heating element group 45 based on the voltage drop value detected by the voltage detection circuit 94 when the heating element group 45 including the heating elements **45*b*1, 45*a*1 to 45*a*5, and 45*b*2 shown in FIG. 7** is energized.

Figure 10:
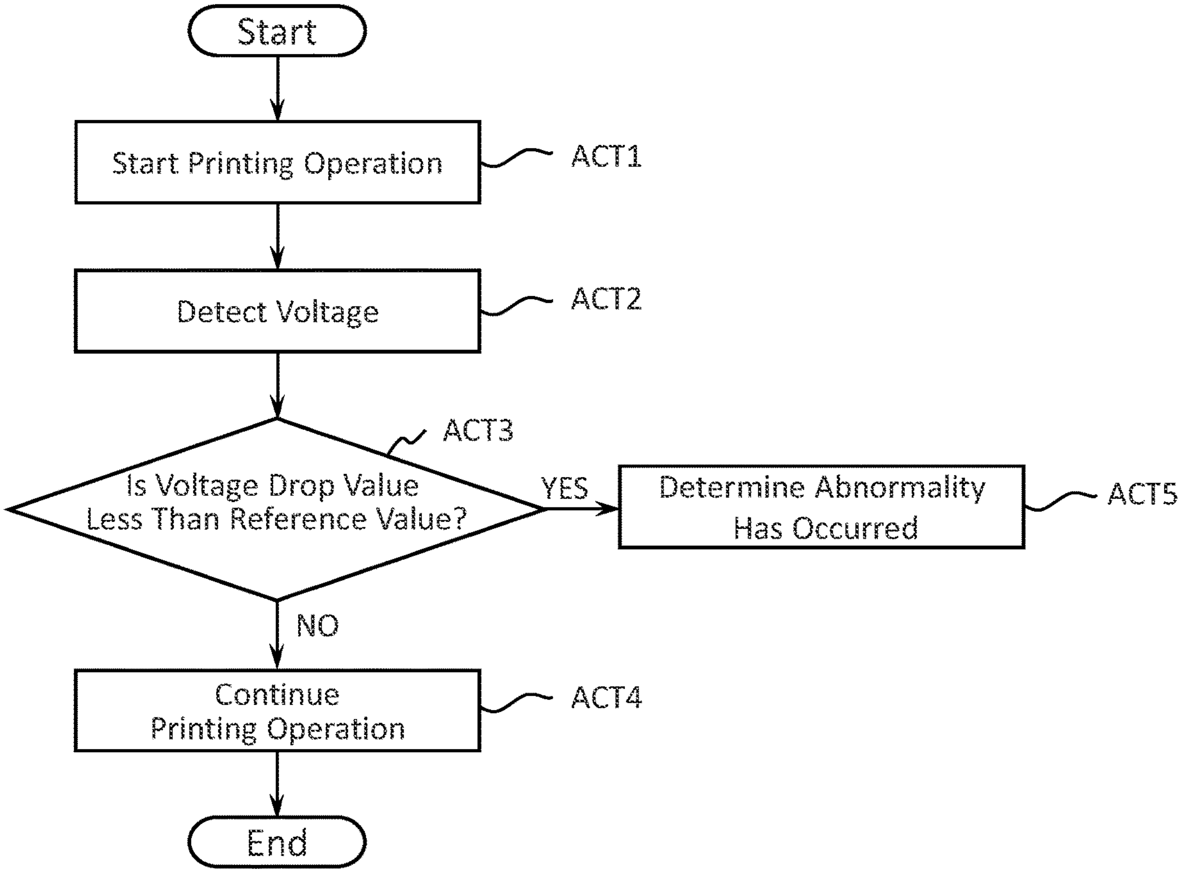
FIG. 10 is a flowchart of a process for determining the presence or absence of abnormality of a heating element.

Hereinafter, an example of an image processing method using the image processing apparatus 100 will be described. FIG. 10 is a flowchart illustrating a method for determining the presence or absence of an abnormality in the heating element group 45. As shown in FIG. 10, the image processing apparatus 100 starts a printing operation in response to a printing operation start instruction from the control panel 8 (ACT1). The image forming unit 3 forms a toner image on a sheet S (see FIG. 1).

The controller 6 starts the heating device 30 in accordance with the start of the printing operation. The controller 6 brings the pressure roller **30*p* into contact with the fixing belt 35 in a pressurized state, and then starts the rotation of the pressure roller 30*p*. The controller 6 controls the power supply 95 to supply electric power to the heating element group 45 of the heater unit 40 so that the heating elements 45*b*1, 45*a*1 to 45*a*5, and 45*b*2 generate heat (see FIGS. 2 and 7**).

The voltage detection circuit 94 (see FIG. 9) detects the voltage applied to the heating element group 45 by the power supply 95 (see FIG. 6) (ACT2).

Figure 11:
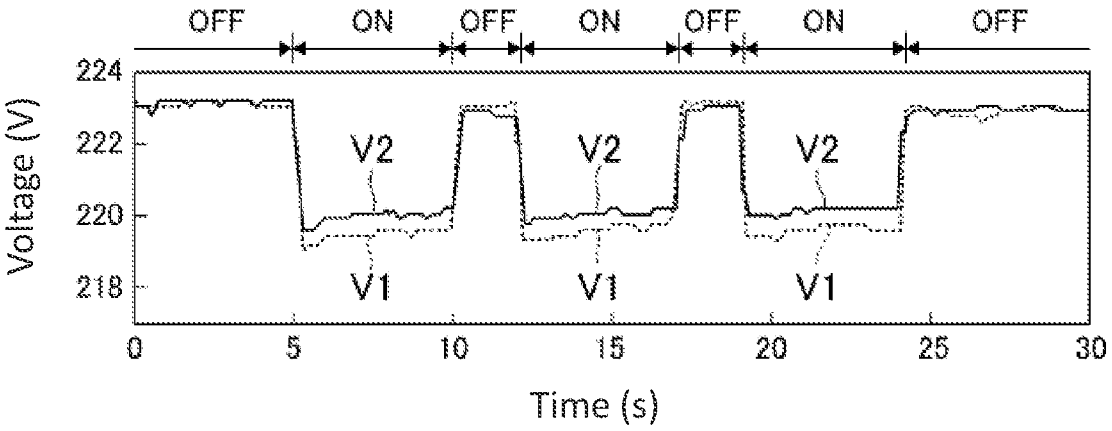
FIG. 11 is a graph depicting voltages applied to a heating element group.

FIG. 11 is a graph illustrating an example of the changes of voltage applied to the heating element group 45. In FIG. 11, "V1" is a voltage when the heating element group 45 including the heating elements **45*b*1, 45*a*1 to 45*a*5, 45*b*2 operates normally; "V2" is a voltage when an abnormality occurs in one of the heating elements 45*b*1, 45*a*1 to 45*a*5, and 45*b*2**.

As shown in FIG. 11, the heating element group 45 is intermittently energized. In FIG. 11, "ON" indicates an energized state, and "OFF" indicates a non-energized state. In this example, "ON" and "OFF" are repeated (cycled). Since a large current flows through the heating element group 45 in the ON state, a voltage drop occurs when energization (ON state) of the heating element group 45 is initially started.

In the heating element group 45, an abnormality due to a disconnection or the like may occur due to excessive current, age-related deterioration (aging), or the like. When such an abnormality occurs, there is a possibility that heat generation will be insufficient and fixing of the toner image to the sheet becomes insufficient.

When an abnormality occurs in at least one of the heating elements **45*b*1, 45*a*1 to 45*a*5, and 45*b*2, no current flows through the heating element in which the abnormality has occurred, and thus the voltage drop value (voltage change) between the OFF and ON states becomes smaller than when each of the heating elements is operating normally. For example, when an abnormality occurs in at least one of the heating elements 45*b*1, 45*a*1 to 45*a*5, and 45*b*2**, the drop value of the voltage V2 from the OFF state to the ON state during energization is smaller than the drop value of the voltage V1 from the OFF state to the ON state during normal operation.

The voltage drop value to be detected or measured is preferably the voltage drop value immediately after energization has started. That is, it is preferable to use the difference between a voltage immediately before the transition from the "OFF" state to "ON" state and a voltage immediately after the transition from "OFF" state to "ON" state (see FIG. 11) as the voltage drop value. In some examples, the voltage drop value may be taken as the difference between the average value measured for the voltage across the heating elements during non-energization (an OFF period) and the average value of the measured voltage across the heating elements during energization (an ON period).

As shown in FIG. 10, the controller 6 determines whether the voltage drop value detected by the voltage detection circuit 94 at energization of the heating element group 45 is lower than a preset reference value (ACT3).

When the detected voltage drop value is lower than the reference value (ACT3: YES), the controller 6 determines that there is an abnormality in the heating element group 45 (ACT5). When the voltage drop value is equal to or greater than the reference value (ACT3: NO), the controller 6 determines that there is no abnormality in the heating element group 45 and continues the printing operation (ACT4). Since the controller 6 compares the voltage drop value with a reference value to determine the presence or absence of abnormality, the accuracy of abnormality determinations can be improved.

When it is determined that there is an abnormality in the heating element group 45, the controller 6 may stop the formation of the toner image by the image forming unit 3 by stopping the image forming unit 3 or the like. As a result, it is possible to avoid the generation of a sheet S on which the toner image will be insufficiently fixed.

When it is determined that there is an abnormality in the heating element group 45, the sheet S on which the toner image has already been formed by the image forming unit 3 may be sent to the heating device 30 in accordance with a normal operation, and the toner image may be heated by the heating device 30, and then the sheet S may be conveyed to the sheet discharge tray 7.

When only some of the plurality of heating elements are abnormal, the heating device 30 may be able to fix the toner image to the sheet S to some extent by the remaining normal heating elements. Therefore, when the sheet S is fed to the heating device 30 as usual, at least a part of the toner image can be fixed to the sheet S. Therefore, scattering of unfixed toner can be avoided.

When it is determined that there is an abnormality in the heating element group 45, it is desirable to stop the conveyance of the sheet S before the toner image is formed. That is, it is desirable that the control portion 6 stops the conveyance of the sheet S to the image forming unit 3 by stopping the conveyance unit 5 or the like. Accordingly, it is possible to suppress the generation of the sheet S on which the toner image is insufficiently fixed. Therefore, wasteful consumption of the toner and the sheet S can be suppressed.

It is desirable that the controller 6 determines whether there is an abnormality in the heating element group 45 at least when the heating device 30 is started (e.g., initially warmed up after an off state or prolonged idle state) and when the heating device 30 is restored from the temporary resting state (e.g., an idle or sleep state). When an abnormality occurs in the heating element group 45, insufficient heating is likely to occur particularly at the time of return from an off or idle state. The temperature of the apparatus is initially low before startup and while in the temporary resting state, therefore, if there is some abnormality in the heating element group 45, there is a possibility that the temperature will be noticeably insufficient during the returning period. Therefore, by determining the presence or absence of an abnormality in the heating element group 45 at startup and during a return from a temporary resting state, it is possible to avoid insufficient fixing of the toner image due to insufficient heat generation by the heating element (s) if a heating element abnormality has occurred.

Figure 12:
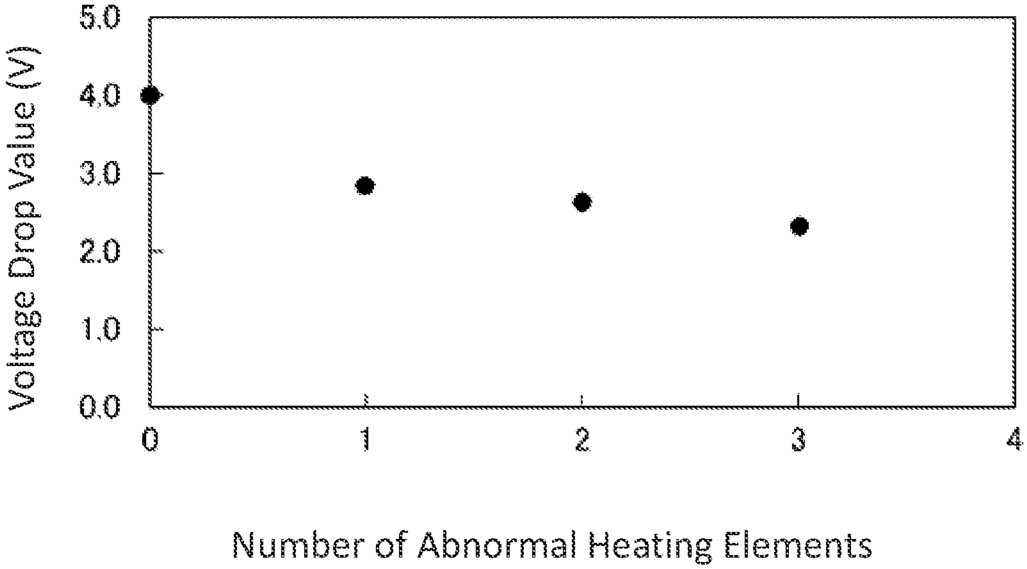
FIG. 12 is a graph depicting a relationship between the number of abnormal heating elements and the voltage drop value.

FIG. 12 is a graph illustrating a relationship between the number of abnormal heating elements and a voltage drop value. As shown in FIG. 12, the larger the number of abnormal heating elements, the smaller the voltage drop value. Therefore, it is also possible to estimate the number of abnormal heating elements based on the voltage drop value.

As described above, the image processing apparatus 100 includes the controller 6 that determines whether there is an abnormality in the heating element group 45 based on the voltage drop value. Therefore, even when the number of thermometers installed in the image processing apparatus 100 is reduced, it is still possible to check whether there is an abnormality in the heating element group 45. For example, in the heating device 30 illustrated in FIG. 8, among the seven heating elements **45*b*1, 45*a*1 to 45*a*5, and 45*b*2, the thermometers are not provided in the range of the heating element 45*a*2 and the heating element 45*a*4 in the y direction. Therefore, the thermometer cannot detect abnormalities in the heating element 45*a*2 and the heating element 45*a*4. However, in the image processing apparatus 100, even when an abnormality occurs in at least one of the heating element 45*a*2 and the heating element 45*a*4**, the occurrence of an abnormality in the heating element can be detected based on the voltage drop value.

As described above, in the image processing apparatus 100, it is possible to detect the abnormality of the heating element group 45 even though the thermometers are installed in not all but only some of the heating elements. Therefore, the number of thermometers to be installed can be reduced. Therefore, it is possible to reduce the number of components of the heating device 30 and simplify the device configuration. Therefore, it is possible to save the space inside the heating device 30 and to reduce the size of the device. In addition, since the number of thermometers installed in the image processing apparatus 100 can be reduced, the cost can be reduced.

As illustrated in FIG. 7, in the image processing apparatus 100, the plurality of heating elements **45*b*1, 45*a*1 to 45*a*5, and 45*b*2** are arranged side by side along the y direction (in this example, the direction orthogonal to the sheet conveyance direction), but the arrangement of the plurality of heating elements is not particularly limited. For example, two or more heating elements among the plurality of heating elements may be arranged side by side along the x direction parallel to the sheet conveyance direction.

In the image processing apparatus 100, the controller 6 determines whether there is an abnormality in the heating element group 45 based on the voltage drop value, but the configuration of the controller 6 is not limited thereto. For example, the controller 6 may use the changes of the current flowing through the heating element group 45 to determine the presence or absence of the abnormality of the heating element group 45.

In other words, the image processing apparatus may have the following configuration. The image processing apparatus includes an image forming unit, a heating device, a voltage detection circuit, and a controller. The image forming unit forms a toner image on a sheet. The heating device includes a heat generator, a fixing belt, and a pressure roller. The heat generator includes a plurality of heating elements that generate heat when energized. The fixing belt fixes the toner image heated by the heat generator to the sheet. The pressure roller presses the fixing belt. The voltage detection circuit detects a voltage applied to the heating element. The controller stops the formation of the toner image by the image forming unit when a drop value of the voltage detected by the voltage detection circuit is lower than a predetermined reference value when the heating element is energized.

Similarly to the image processing apparatus 100, the image processing apparatus configured as described above can reduce the number of components of the heating device 30 and simplify the apparatus configuration. Therefore, it is possible to save the space inside the heating device 30 and to reduce the size of the device. Further, since the image processing apparatus having the above-described configuration can reduce the number of thermometers to be installed, the cost can be reduced.

The image processing apparatus 100 as described above is an image forming apparatus. Alternatively, the image processing apparatus 100 may be a decoloring apparatus. The decoloring device performs a process of decoloring or erasing the image formed on the sheet with decolorable toner. The decoloring unit heats and decolors the decolorable toner image formed on the sheet passing through the nip N.

The heating device 30 of the image processing apparatus 100 may include a heat generator including a plurality of heat generation elements that generate heat by energization, a voltage detection circuit that detects a voltage applied to the heat generator, and a controller that determines of an abnormality of the heating elements based on a drop value of the voltage detected by the voltage detection circuit when the heating elements are energized.

According to at least one embodiment described above, the image processing apparatus 100 can detect an abnormality of a heating element even when the number of thermometers is reduced. Therefore, the number of thermometers to be installed can be reduced. Therefore, it is possible to reduce the number of components of the heating device 30 and simplify the device configuration. Therefore, the size and cost of the apparatus can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:

an image forming unit configured to form an image on a sheet;

a heating device including a belt that contacts the sheet and a plurality of heating elements for heating the belt, the heating elements being arranged on a substrate along a longitudinal direction perpendicular to a sheet conveyance direction and including a first heating element at a center position of the substrate in the longitudinal direction;

a pressure roller configured to press the sheet against the belt, the pressure roller including a thermometer facing the first heating element;

a voltage detection circuit configured to measure a voltage applied to the heating elements; and a controller configured to determine a number of abnormal elements among the heating elements according to a voltage drop value that is based on voltages measured by the voltage detection circuit before and after the plurality of heating elements is energized.

2. The image processing apparatus according to claim 1, wherein the controller determines whether at least one of the heating elements is abnormal when the heating device is started.

3. The image processing apparatus according to claim 1, wherein the controller determines whether at least one of the heating elements is abnormal when the heating device returns from a sleep state.

4. The image processing apparatus according to claim 1, wherein the heating elements include a second heating element adjacent to the first heating element in a first direction parallel to the longitudinal direction.

5. The image processing apparatus according to claim 4, wherein the heating elements include a third heating element adjacent to the first heating element in a direction opposite to the first direction.

6. The image processing apparatus according to claim 5, wherein the controller is further configured to control the first heating element independently of the second and third heating elements.

7. The image processing apparatus according to claim 1, wherein the controller is configured to compare the voltage drop value to a reference value to determine whether at least one of the heating elements is abnormal.

8. The image processing apparatus according to claim 1, wherein the controller is further configured to stop the image forming unit when at least one of the heating elements is determined to be abnormal.

9. The image processing apparatus according to claim 1, wherein the controller stops a conveyance of the sheet before the image is formed.

10. The image processing apparatus according to claim 1, wherein the image forming unit forms the image on the sheet using toner.

11. The image processing apparatus according to claim 1, wherein the belt includes a first thermometer contacting the belt and facing the first heating element.

12. The image processing apparatus according to claim 11, wherein the belt includes a second thermometer contacting the belt and facing the second heating element.

13. The image processing apparatus according to claim 1, further comprising:

a heat conductor between the pressure roller and the plurality of heating elements.

14. The image processing apparatus according to claim 13, further comprising:

a plurality of conductor thermometers on the heat conductor.

15. The image processing apparatus according to claim 1, wherein the heating device includes a thermostat positioned corresponding to at least one of the heating elements.

16. An image processing apparatus, comprising:

an image forming unit configured to form an image on a sheet;

a heating device including a belt that contacts the sheet and a plurality of heating elements for heating the belt, the heating elements being arranged on a substrate along a longitudinal direction perpendicular to a sheet conveyance direction, the heating elements including a first heating element at a center position of the substrate in the longitudinal direction and a second heating element adjacent to the first heating element in a first direction parallel to the longitudinal direction, the belt including a first thermometer contacting the belt and facing the first heating element and a second thermometer contacting the belt and facing the second heating element;

a pressure roller configured to press the sheet against the belt;

a voltage detection circuit configured to measure a voltage applied to the heating elements; and a controller configured to determine a number of abnormal elements among the heating elements according to a voltage drop value that is based on voltages measured by the voltage detection circuit before and after the plurality of heating elements is energized.

17. The image processing apparatus according to claim 16, wherein the controller determines whether at least one of the heating elements is abnormal when the heating device is started.

18. The image processing apparatus according to claim 16, wherein the controller determines whether at least one of the heating elements is abnormal when the heating device returns from a sleep state.

19. The image processing apparatus according to claim 16, wherein the controller is configured to compare the voltage drop value to a reference value to determine whether at least one of the heating elements is abnormal.

20. The image processing apparatus according to claim 16, wherein the controller is further configured to stop the image forming unit when at least one of the heating elements is determined to be abnormal.

* * * * *